(12) United States Patent
Das (10) Patent No.: US 8,296,329 B1
(45) Date of Patent: Oct. 23, 2012

(54) CONTROLLER WITH HEURISTIC BUNDLE OPTIMIZER FOR DATA CENTER MIGRATION OR OTHER TYPE OF TRANSITION

(75) Inventor: Vaskar Das, Frankfort, IL (US)

(73) Assignee: EMC Corporation, Hopkinton, MA (US)

( * ) Notice: Subject to any disclaimer, the term of this patent is extended or adjusted under 35 U.S.C. 154(b) by 377 days.

(21) Appl. No.: 12/633,837

(22) Filed: Dec. 9, 2009

(51) Int. Cl.
*G06F 17/30* (2006.01)

(52) U.S. Cl. ...................................... 707/802
(58) Field of Classification Search .................. None
See application file for complete search history.

(56) References Cited

U.S. PATENT DOCUMENTS

| | | | |
|---|---|---|---|
| 7,831,695 B1 * | 11/2010 | Burr et al. | 709/220 |
| 2007/0198797 A1 * | 8/2007 | Kavuri et al. | 711/165 |
| 2008/0077366 A1 * | 3/2008 | Neuse et al. | 703/2 |

* cited by examiner

*Primary Examiner* — Syed Hasan
(74) *Attorney, Agent, or Firm* — Ryan, Mason & Lewis, LLP (57) ABSTRACT

In an information management system, a controller implements a heuristic bundle optimizer to facilitate a migration or other type of transition of at least a portion of a data center from a first configuration to a second configuration. The controller identifies a plurality of component bundling scenarios each specifying a separation of a given set of components associated with the first and second configurations into bundles for transitioning on a per-bundle basis from the first configuration to the second configuration. The controller also evaluates the component bundling scenarios, and determines an optimal one of the component bundling scenarios. The portion of the data center is then transitioned from the first configuration to the second configuration with the components being transitioned in the bundles specified by the optimal component bundling scenario.

20 Claims, 3 Drawing Sheets

CONTROLLER WITH HEURISTIC BUNDLE OPTIMIZER FOR DATA CENTER MIGRATION OR OTHER TYPE OF TRANSITION

FIELD OF THE INVENTION

The present invention relates generally to the field of information management, and more particularly to data center migration, data center transformation or other types of data center transitions from one configuration to another.

BACKGROUND OF THE INVENTION

Data centers typically host a wide variety of information systems that run or support a company's business. Today's business environment is complex and correspondingly the information systems that run or support the business are complex with various levels of functional and technical interdependencies. For example, Human Resources and Financial systems include various functional components (Human Resources—Payroll, Time & Labor, Core HR, Benefits, etc.; Financials—General Ledger, Accounts Payable, Accounts Receivable, Billing, etc.) with numerous interactions between these components. As one illustration of such an interaction, the Human Resources Payroll component that supports a company's payroll has a critical interface with the Financial General Ledger component—in order to ensure that every paycheck paid to employees by the HR department is properly accounted for by the company's Finance and Accounting department. Also, these information systems include both logical technical components such as web servers, application servers, and database servers, as well as physical technical components such as server hardware (e.g., CPU, memory), network hardware, storage hardware, etc. The physical technical components occupy real estate in a data center and are themselves dependent on a variety of other infrastructure components such as the data center power, cooling, cabling, cabinet and floor layout.

In addition, the information systems and their dependencies as mentioned above are always in a state of change—due to business drivers (mergers, acquisitions, divestitures, growth, regulations, change in business model, etc.) as well as technology drivers (new technologies, upgrades, enhancements, replacements, consolidation, software development life cycle, support lifecycle, etc). Large organizations use tools such as CMDB (configuration management database) and change management processes to control their IT environments. However, there is no single tool that is able to assess the complete set of dependencies and consequently determine impact to business of a data center migration of a given set of applications, servers or other components from one configuration to another. Due to the critical importance of information systems in today's world, any interruption to the information systems translates into an interruption of the company's business.

Conventional approaches fail to minimize the business risk during a data center migration. Such approaches instead generally focus on specific components (e.g., a set of applications or servers being migrated) without qualifying and quantifying the overall impact to a client's IT environment. Also, these conventional approaches do not readily scale, and thus the level of effort needed becomes prohibitive for large data center migration projects (e.g., over 500 applications or 1000 servers). The conventional approaches are therefore unduly complicated, time-consuming and costly when used for such projects. Similar problems arise in contexts not involving a full migration but instead involving a different type of transformation or other transition of a data center.

SUMMARY OF THE INVENTION

Illustrative embodiments of the present invention overcome the above-described deficiencies of conventional practice by providing a controller that implements a heuristic bundle optimizer. More specifically, the controller is configured to efficiently determine optimal component bundling scenarios that can minimize business interruption during a data center migration, transformation or any other type of data center transition from one configuration to another configuration.

In one aspect of the invention, an information management system comprises a controller coupled to or otherwise associated with a data center where at least a portion of the data center is to be transitioned from a first configuration to a second configuration. The controller identifies a plurality of component bundling scenarios each specifying a separation of a given set of components associated with the first and second configurations into bundles for transitioning on a per-bundle basis from the first configuration to the second configuration. The controller also evaluates the component bundling scenarios, and determines an optimal one of the component bundling scenarios. The portion of the data center is then transitioned from the first configuration to the second configuration with the components being transitioned in the bundles specified by the optimal component bundling scenario.

In at least one of the illustrative embodiments, the plurality of component bundling scenarios may be determined by identifying functional attributes of the portion of the data center to be transitioned from the first configuration to the second configuration, assigning weights to respective ones of the functional attributes, and applying a predetermined rules framework to the weighted functional attributes to identify the component bundling scenarios. The identified attributes may be recorded in a structured normalized form in a relational database of the system. Also, the assignment of weights to the attributes may more specifically include at least one of assigning ordinality weights to the respective attributes based on a relative sequence of utility, and assigning cardinality weights to the respective attributes based on a relative magnitude of utility.

The illustrative embodiments advantageously overcome the above-noted drawbacks of conventional approaches to data center migration. For example, the heuristic bundle optimizer minimizes the business risk during a data center migration by globally qualifying and quantifying the overall impact to the client's IT environment, using utility maximization principles. This approach also supports scalability to large data center migration projects (e.g., over 500 applications or 1000 servers) using an iterative approach (e.g., incremental optimization using incremental data).

These and other features and advantages of the present invention will become more readily apparent from the accompanying drawings and the following detailed description.

DETAILED DESCRIPTION

The present invention will be described herein with reference to exemplary information management systems and associated data centers, controllers and other processing devices. It is to be appreciated, however, that the invention is not restricted to use with the particular illustrative system and device configurations shown. For example, the techniques disclosed herein can be applied to a wide variety of different types of data centers. The term "data center" as used herein is therefore intended to be broadly construed so as to encompass numerous different types of IT environments. Moreover, although the disclosed techniques will be illustrated herein in the context of data center migration, these techniques can be adapted in a straightforward manner for use with other types of transformations or more generally transitions of a data center from one configuration to another.

Figure 1:
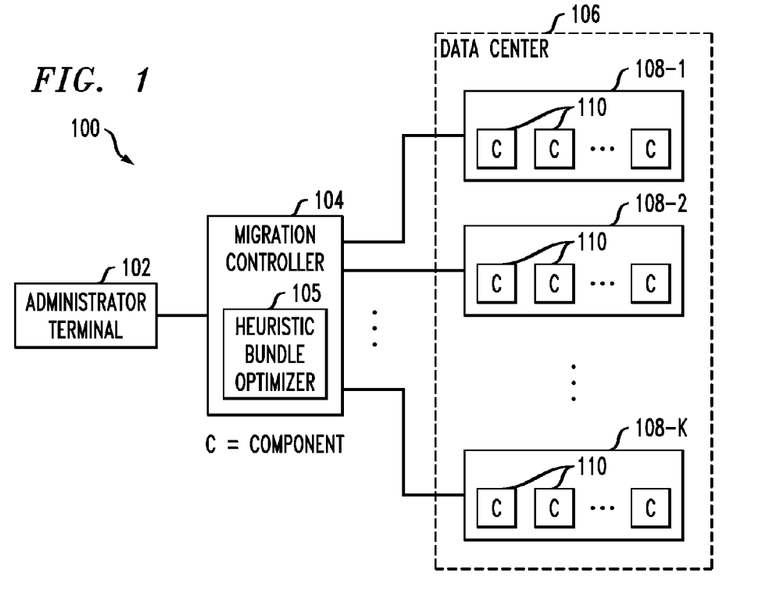
FIG. 1 is a block diagram showing one example of an information management system that implements a migration controller having a heuristic bundle optimizer for data center migration in an illustrative embodiment of the invention.

FIG. 1 shows an example of an information management system 100 which includes an administrator terminal 102, a migration controller 104 having a heuristic bundle optimizer 105, and a data center 106 that comprises K distinct sets 108 of components 110. The components 110 may comprise applications, servers or other types of components, in any combination. Each of the sets 108-1, 108-2, . . . 108-K may comprise different types and arrangements of components. The particular number of components in a given such set of components is arbitrary and may vary depending upon the implementation.

The system 100 is configured to implement data center migration using the heuristic bundle optimizer 105 of migration controller 104, as will be described in greater detail below. Such migration may involve, for example, migrating each of one or more of the component sets 108 from a first configuration to a second configuration. This migration may occur in situations in which the data center applications or servers are being upgraded or replaced, as well as in numerous other contexts.

The terminal 102 and migration controller 104 may be viewed as examples of what is more generally referred to herein as a "processing device." Such a device generally comprises at least one processor and an associated memory, and implements functional modules for data center migration in a manner to be described herein.

It is to be appreciated that a given embodiment of the system 100 may include multiple instances of terminal 102, migration controller 104 and data center 106, although only single instances of such elements are shown in the simplified system diagram of FIG. 1 for clarity of illustration.

The data center 106 may comprise, for example, a single-site system, or a distributed system in which the sets of components 108 need not be located at a single site but are instead accessible via a network such as the Internet. The latter type of arrangement may be implemented as a so-called "cloud" system. A particular component 110 may thus be implemented as a computer or other stand-alone processing platform, or may be distributed over multiple processing platforms each comprising one or more separate computers. Numerous other arrangements of multiple components are possible in the data center 106. These components can communicate with other elements of the information management system 100 over any type of network, such as a wide area network (WAN), a local area network (LAN), a satellite network, a telephone or cable network, or various portions or combinations of these and other types of networks.

Figure 2:
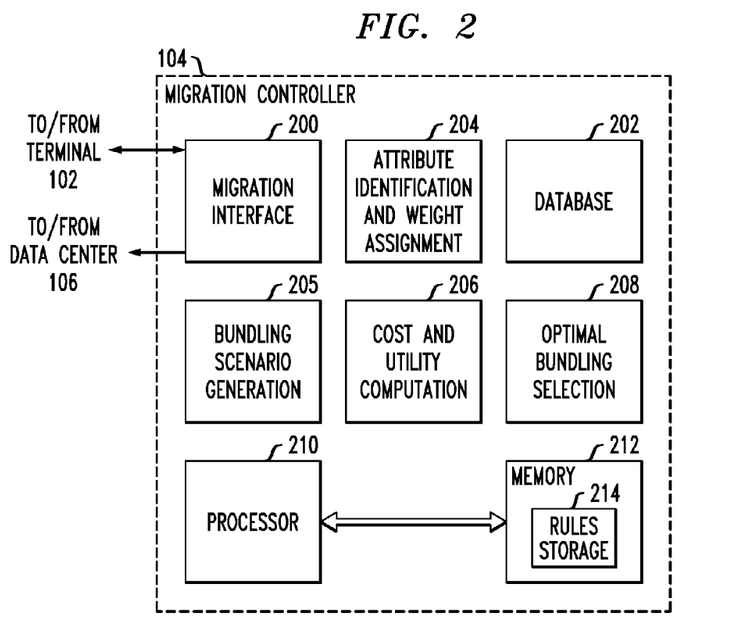
FIG. 2 is a more detailed view of the migration controller of the FIG. 1 system.

FIG. 2 shows a more detailed view of the migration controller 104 in an illustrative embodiment. The migration controller 104 comprises a migration interface 200 through which the controller communicates with the administrator terminal 102 and the data center 106. This interface may generate, for example, a graphical user interface that is presented on the terminal 102, and a command and control interface for controlling the migration of the data center from a first configuration to a second configuration based on determinations made using the heuristic bundle optimizer 105.

The migration controller 104 also includes a database 202 and a number of modules that form portions of the heuristic bundle optimizer 105. These modules include attribute identification and weight assignment module 204, a bundling scenario generation module 205, a cost and utility computation module 206, and an optimal bundling selection module 208. This particular arrangement of heuristic bundle optimizer modules is presented by way of example only, and additional or alternative modules may be utilized in other embodiments. The present invention does not require any particular separation of the heuristic bundle optimizer functionality into particular modules. Examples illustrating the operation of the modules 204, 205, 206 and 208 of the heuristic bundle optimizer 105 will be described below in conjunction with the flow diagrams of FIGS. 3 and 4.

The migration controller 104 in this embodiment further comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

The modules 204, 205, 206 and 208 of the migration controller 104 may be implemented in whole or in part in the form of one or more software programs stored in memory 212 and executed by processor 210. The memory 212 may be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device such as migration controller 104 causes the device to perform corresponding operations associated with functions such as data center migration. One skilled in the art would be readily able to implement such software given the teachings provided herein. Other examples of computer program products embodying aspects of the invention may include, for example, optical or magnetic disks.

The memory 212 in this embodiment includes rules storage 214 for storing rules that are utilized by the migration controller 104 in one or more of the modules 204, 205, 206 and 208 of the heuristic bundle optimizer 105.

As indicated previously, for large data center migration projects (e.g., with over 500 applications or 1000 servers), conventional approaches are excessively complicated, time-consuming and costly. The migration controller 104 in the illustrative embodiments addresses this significant drawback of conventional practice by providing an automated and systematic process that efficiently determines an optimal bundling scenario of least cost or maximum utility for a given large-scale migration project.

It should be noted that terms such as "optimal" and "optimize" as used herein are intended to be broadly construed, and are not required to yield a particular absolute maximum or minimum of any given quantity.

Before describing the data center migration processes in greater detail, a theoretical description of the migration process will be provided so as to facilitate an understanding of the improvements provided in the illustrative embodiments of the present invention. This theoretical description illustrates the rapid escalation in complexity of developing the optimal bundling scenario as the size of the data center environment increases.

Assume the data center environment comprises N macroscopic functional components where N1=# of Applications
N2=# of Servers
N3=# of Business Processes
N4=# of People in the IT environment
N5=# of Data Centers
N6=# of Storage Frames
N=N1+N2+N3+N4+N5+N6
R=# of bundles allowable within a given period of time to perform the data center migration Since there are N unique components and R potential bundles, using the mathematics of permutations and combinations, the total number of degrees of freedom (a measure of the sum of the individual mobilities of these components) is $$\Sigma\Sigma\Sigma(\Pi(^{N}C_{i}^{N-1}C_{k}\ldots \text{to } R \text{ factors})), i, j, k, =1, 2, 3 \ldots$$
$N$, such that $i+j+k\ldots=N$ where C denotes the combinations function. However, the mobility of these components is restricted by environmental constraints. The number of constraints is a product function of N1, N2, N3 . . . , i.e. F1(N1) F2(N2) F3(N3) . . . . For simplicity of description, we will focus only on the first macroscopic component, i.e., the N1 applications. Also, assume R=2. Then, the number of degrees of freedom is $$\Sigma^{N1}C_{m\, m=1,2,3,\ldots N1}=2^{N1}-1$$

Also, we can approximate the number of constraints by $N1^P$ where p is an integer >1. As a result, the number of available degrees of freedom is $$F(N1)=2^{N1}-N1^P$$

The first derivative of F(N1) with respect to N1 is $$F'(N1)=(\ln 2)2^{N1}-pN1^{P-1}$$

It can be shown that under "normal" conditions where N1>10 and p<3, this function is monotonically increasing with N1 since F'(N1)>0. In other words, the number of possible mobility options increases with the number of components, even though the number of constraints increases as well. This illustrates that the complexity of the migration bundling process increases at an extremely fast rate when the number of components (e.g., the number of applications) increases. As such, an efficient algorithm to optimize bundling becomes increasingly beneficial.

In general, if the number of components to be migrated is given by N, the number of bundles R for a given bundling scenario can be anywhere from 1 to N, i.e., 1 if all components are bundled together to migrate as one unit, or N if each component is moving individually as a separate unit.

In order to migrate N components in R bundles, the number of scenarios is obtained by determining how many ways N unique components can be packed in R unique bundles. The reason for uniqueness is the that each data center component (e.g., application, server, SAN, etc.) is unique and each bundle is unique due to its schedule and sequence. Since each bundle should have at least one component, the first R (of N) components can be selected and put in each of the R bundles in $^{N}P_{R}$ ways, where P denotes the permutations function. Next, there are N-R components left which can be placed in any of the R bundles in $R^{N-R}$ ways (i.e., each of the N-R components can be placed in any of the R bundles). Thus, the total number of scenarios is $$\sum_{R=1}^{R=N} {^{N}P_{R}} * R^{N-R}$$

For simplicity, we assume the special case where R is fixed, i.e., total number of scenarios is $$^{N}P_{R}*R^{N-R}$$

Also, for simplicity, we assume that on applying a consideration (such as a hard application to application dependency with infinite or prohibitive cost), the number of moving components is reduced by 1 from N to N−1. Then the total number of scenarios is $$^{N-1}P_{R}*R^{N-1-R}$$

Taking the ratio of the two numbers above we have a scenario reduction factor given by $$^{N}P_{R}*R^{N-R}/^{N-1}P_{R}*R^{N-1-R}=(N*R)/(N-R) \text{ which is}$$
$$>R(\sim=R+R^2/N \text{ when } R<<N).$$

Thus, in a large data center migration project in which N=1600 and R=30, the scenario reduction factor is 30.57. This illustrates that by incorporating just one strong consideration, e.g., the hard application to application dependency with infinite or prohibitive cost noted above, the number of degrees of freedom and thus the number of bundling scenarios can be reduced significantly. In the above example, the number is reduced by a factor of approximately 30. This indicates that the stronger considerations (i.e., the considerations with infinite or prohibitive cost) should be applied first, so that the optimization algorithm works more efficiently. Also, the approximation $^{N}P_{R}*R^{N-R}$ shows how the total number of scenarios grows very quickly with the number of components N, illustrating that an automated efficient algorithm of the type disclosed herein is required to determine an optimal bundling scenario in practical data center migration projects. The heuristic bundle optimizer 105 is used to implement such algorithms in the illustrative embodiments.

Figure 3:
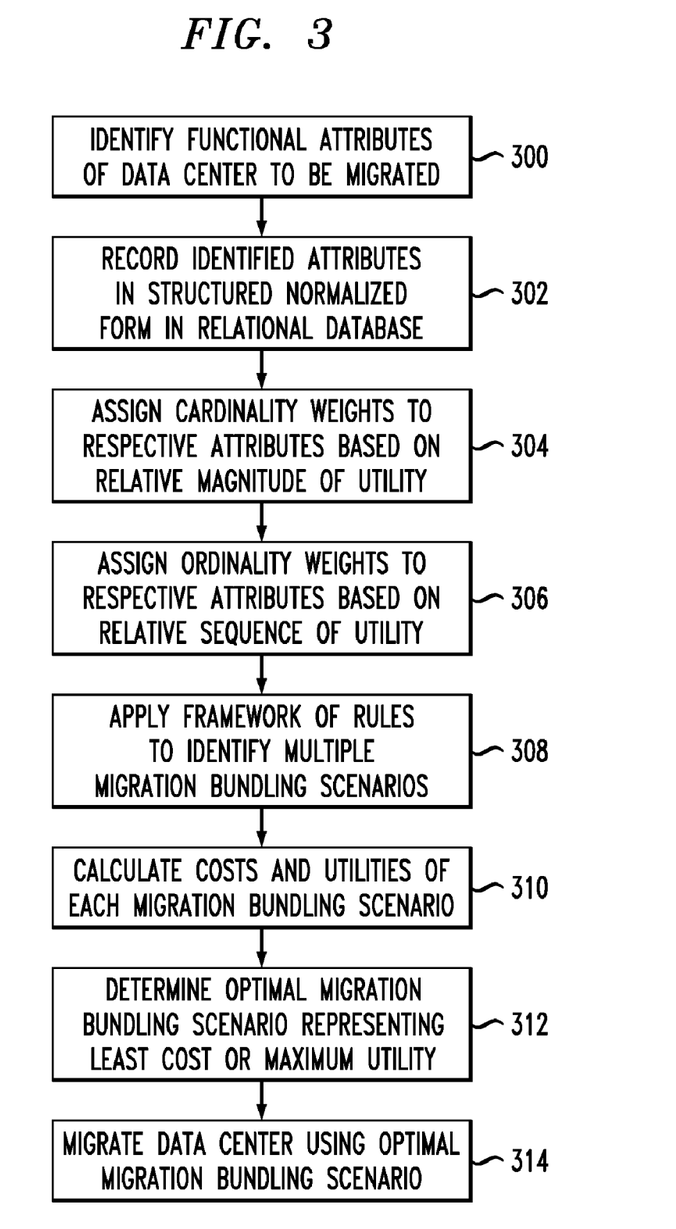
FIG. 3 is a flow diagram of an exemplary technique for data center migration using the migration controller of the FIG. 1 system.

Referring now to FIG. 3, a process of data center migration is shown, as implemented in system 100 using the heuristic bundle optimizer 105 of the migration controller 104. The process as shown includes steps 300 through 314.

In step 300, functional attributes of the data center to be migrated are identified. This may involve, for example, identifying dependencies among the various components 110 that are subject to the migration. Such dependencies may include, again by way of example, application to application dependencies, application to server dependencies, and server to storage area network (SAN) dependencies. There may be multiple types of each of these categories of dependencies. For instance, in a more detailed example to be described elsewhere herein, there are two different types of application to application dependencies, including a "hard" application to application dependency and a "soft" application to application dependency.

In step 302, the identified attributes are recorded in structured normalized form in a relational database, which may be implemented as part of the database 202 of the migration controller 104. This recording process generally involves the insertion of data into tables, as will be illustrated in an example to be described later. Default attributes may be assigned where information is not available.

In steps 304 and 306, weights are assigned to respective ones of the functional attributes based on the utility or importance of each of these attributes. Both cardinality and ordinality weights are assigned in the present embodiment, but other embodiments could utilize either cardinality or ordinality weights. Cardinality weights are assigned in step 304 to measure the utility based on a relative magnitude of utility. Ordinality weights are assigned in step 306 to measure the relative sequence of utility. Other types of weights may be assigned in alternative embodiments.

In step 308, a predetermined framework of rules is applied to identify multiple migration bundling scenarios. These rules may be stored in the rules storage 214 of the memory 212. The migration bundling scenarios are examples of what are more generally referred to herein as "component bundling scenarios." Such bundling scenarios generally indicate the manner in which components should be bundled together for migration, transformation or other transition of the data center 106 from one configuration to another. Each bundling scenario therefore generally specifies a separation of at least a given set of components associated with first and second configurations of the data center into bundles for transitioning on a per-bundle basis from the first configuration to the second configuration.

In step 310, the costs and utilities of each migration bundling scenario are calculated. This portion of the process utilizes an automated heuristic algorithm to be described in greater detail below.

In step 312, an optimal migration bundling scenario is determined representing least cost or maximum utility.

In step 314, the data center 106 is migrated from a first configuration involving at least a given set of components 110 to another configuration involving that set of components 110 in accordance with the optimal migration bundling scenario determined in step 312. Thus, the data center 106 is transitioned from the first configuration to the second configuration with the components 110 being transitioned in the bundles specified by the optimal migration bundling scenario.

As indicated previously, the steps of the FIG. 3 process are implemented in the migration controller 104 of the system 100. In alternative embodiments, additional or alternative process steps may be used, or the ordering of the steps may be altered relative to the ordering in the FIG. 3 process.

Figure 4:
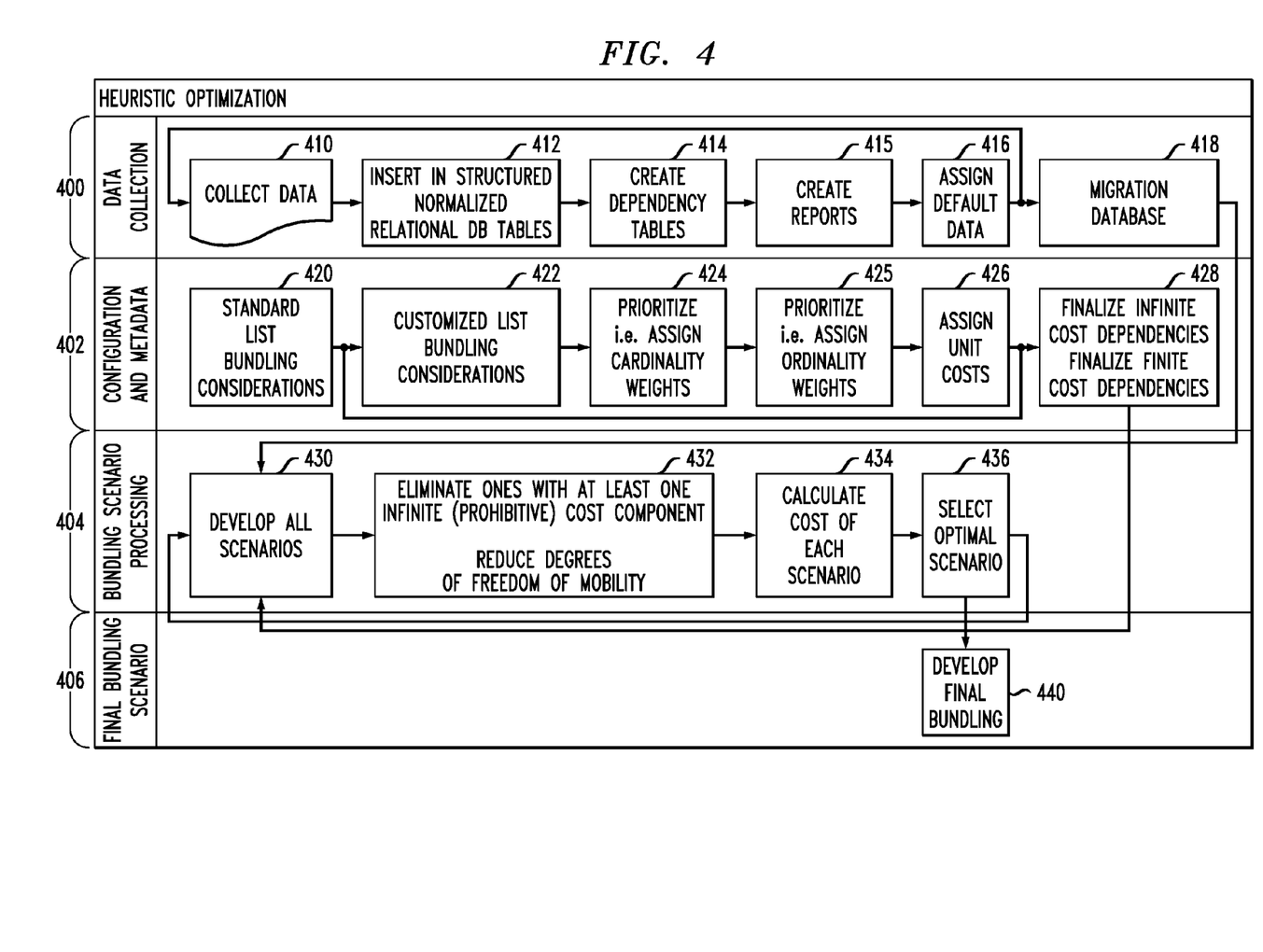
FIG. 4 is a flow diagram showing another exemplary technique for data center migration using the migration controller of the FIG. 1 system.

Another exemplary data center migration process that may be implemented using migration controller 104 is shown in FIG. 4. In this embodiment, the process is separated into four general portions, including a data collection portion 400, a configuration and metadata portion 402, a bundling scenario processing portion 404, and a final bundling scenario portion 406. The process includes steps 410 through 440.

In the data collection portion 400 of the process, data is collected in step 410 regarding the data center to be migrated. This data will generally include, for example, data characterizing at least a given set of components to be transitioned in bundles from a first or current configuration of the data center to a second or migrated configuration which the data center will utilize after the migration. The collected data is inserted in structured normalized relational database tables in step 412. Dependency tables are then created in step 414, and reports are created in step 415. Default data may be assigned in step 416 where actual data is not available. The resulting tables, reports and other information are used to form a migration database in step 418.

In the configuration and metadata portion 402 of the process, the contents of the migration database are further processed using standard list bundling considerations in step 420, and customized list bundling considerations in step 422. The attributes are then prioritized by assigning cardinality weights in step 424 and ordinality weights in step 425. Unit costs are then assigned in step 426. Infinite and finite cost dependencies are then finalized in step 428.

In the bundling scenario generation portion 404 of the process, the migration bundling scenarios are developed in step 430. Those scenarios that have at least one infinite or prohibitive cost component are eliminated in step 432. Also, the degrees of freedom of the mobility may be reduced in this step. The costs of each remaining bundling scenario are calculated in step 434, and the optimal bundling scenario is selected in step 436.

Finally, in the final bundling scenario portion 406 of the process, the optimal bundling scenario previously selected in step 436 is further adjusted and otherwise developed as necessary before it is utilized in the migration of data center 106 from the first configuration to the second configuration. The data center is therefore transitioned from the first configuration to the second configuration with the components 110 being transitioned in the bundles specified by the optimal component bundling scenario.

Again, the particular process steps and their ordering in the FIG. 4 flow diagram are for purposes of illustration only. Other embodiments could use additional or alternative steps, combine various ones of the steps, alter the ordering of the steps, etc.

A detailed example of the data center migration process illustrated in the FIG. 4 flow diagram will now be described. It will be assumed for this example that the components involved in the data center migration include applications, servers, and devices identified by SAN logical unit number (SAN-LUN).

The data associated with these components is initially collected and stored in relational database tables. Shown below are three such tables, one for applications, one for servers, and one for SAN-LUNs.

| Application Id | Application Name | Business Unit Owner |
|---|---|---|
| A1 | App1 | BUOwner1 |
| A2 | App2 | BUOwner1 |
| A3 | App3 | BUOwner1 |

| Server Id | Application Name | Infrastructure Owner |
|---|---|---|
| S1 | Server1 | InfraOwner1 |
| S2 | Server2 | InfraOwner2 |
| S3 | Server3 | InfraOwner3 |

| LUN Id | SAN-LUN Name | Infrastructure Owner |
|---|---|---|
| L1 | SAN1 | InfraOwner1 |
| L2 | SAN2 | InfraOwner1 |
| L3 | SAN3 | InfraOwner1 |

A number of dependency tables are then created, as shown below. These include an application to server mapping table, a server to application mapping table, a SAN to server mapping table, an interface mapping table showing unknowns, and an updated interface mapping table with the unknowns replaced by defaults.

Application to Server Mapping Table

| App Name | Business Unit Owner | Server Name |
|---|---|---|
| App1 | BUOwner1 | Server1 |
| App2 | BUOwner2 | Server2 |
| App3 | BUOwner3 | Server3 |

Server to Application Mapping Table

| Server Name | App Name | Infrastructure Owner |
|---|---|---|
| Server1 | App1 | InfraOwner1 |
| Server1 | App3 | InfraOwner1 |
| Server2 | App2 | InfraOwner2 |

SAN to Server Mapping Table

| SAN-LUN Name | Server Name |
|---|---|
| SAN1 | Server1 |
| SAN2 | Server2 |
| SAN2 | Server3 |

Interface Mapping Table Showing Unknowns

| App From | App To | Directional | Originator | Protocol |
|---|---|---|---|---|
| App1 | App2 | Two way | Forward | IIOP |
| App1 | App3 | None | None | None |
| App2 | App3 | Unknown | Unknown | Unknown |

Interface Mapping Table with Unknowns Replaced by Defaults

| App From | App To | Directional | Originator | Protocol |
|---|---|---|---|---|
| App1 | App2 | Two way | Forward | IIOP |
| App1 | App3 | None | None | None |
| App2 | App3 | One way | Forward | HTTPS |

A bundling considerations table with assigned unit costs is then created, as shown below. This bundling considerations table may include a combination of standard and customized bundling considerations. In the present example, the table includes cost per unit utility for various dependencies as specified in the above dependency tables.

| Dependency Consideraton | Dependency Type | Unit Cost | Cost Description |
|---|---|---|---|
| App to App | Hard - IIOP, SQL Net | 10 | Cost of downtime of the interface, e.g., if a Financial General Ledger app cannot get latest payroll data from HR system |
| App to App | Soft - HTTPS, FTP, JMS, ETL | 5 | Cost of a batch job being down or an application not accessible for web-based self-service |
| App to Server | Resides | 20 | Cost of newly rebuilding an image of the application in a new server |
| Server to SAN | Zoned | 99999 | Cost (very prohibitive or infinite) of re-architecting and re-implementing the SAN zoning structure. |
| Migration Event | Global | $\Sigma$ Power (10, #apps in bundle) | Cost of staffing and managing one migration event and risk of application concurrency |

A number of bundling scenarios are then generated. In the present example, the following five application-centric bundling scenarios are generated for the applications App1, App2 and App3.
Scenario1: (App1), (App2), (App3)
Scenario2: (App1, App2), (App3)
Scenario3: (App1), (App2, App3)
Scenario4: (App1, App3), (App2)
Scenario5: (App1, App2, App3)
The scenarios are more specifically shown in the following tables.

| Scenario | Bundle Component | Bundle 1 | Bundle 2 | Bundle 3 |
|---|---|---|---|---|
| Scenario 1 | Application Server | App1 Server1 | App2 Server2 | App3 Server1 |
| | SAN-LUN | SAN1 | SAN2 | SAN1 |

| Scenario | Bundle Component | Bundle 1 | Bundle 2 | Bundle 3 |
|---|---|---|---|---|
| Scenario 2 | Application Server | App1, App2 Server1, Server2 | App3 Server1 | |
| | SAN-LUN | SAN1, SAN2 | SAN1 | |

| Scenario | Bundle Component | Bundle 1 | Bundle 2 | Bundle 3 |
|---|---|---|---|---|
| Scenario 3 | Application Server | App1 Server1 | App2, App3 Server1, Server2 | |
| | SAN-LUN | SAN1 | SAN1, SAN2 | |

| Scenario | Bundle Component | Bundle 1 | Bundle 2 | Bundle 3 |
|---|---|---|---|---|
| Scenario 4 | Application Server | App1, App3 Server1 | App2 Server2 | |
| | SAN-LUN | SAN1 | SAN2 | |

| Scenario | Bundle Component | Bundle 1 | Bundle 2 | Bundle 3 |
|---|---|---|---|---|
| Scenario 5 | Application Server SAN-LUN | App1, App2, App3 Server1, Server2 SAN1, SAN2 | | |

Costs are then determined for each of the five scenarios, as outlined in the tables below. Table entries in italics indicate components whose dependencies are compromised in the corresponding scenario.

| Scenario | Bundle Component | Bundle 1 | Bundle 2 | Bundle 3 |
|---|---|---|---|---|
| Scenario 1 | Application Server SAN-LUN | App1 Server1 SAN1 | *App2* Server2 SAN2 | *App3* *Server1* *SAN1* |

| Dependency Consideration | Dependencies Compromised | Unit Cost | Number of Instances | Itemized Cost |
|---|---|---|---|---|
| App to App (Hard) | App1-App2 | 10 | 1 | 10 |
| App to App (Soft) | App2-App3 | 5 | 1 | 5 |
| App to Server | App3-Server1 | 20 | 1 | 20 |
| Server to SAN | Server1-SAN1 | 99999 | 1 | 9999 |
| Migration Event | Bundles 1-3 | Σ 10, 10, 10 | 3 | 30 |
| Total Cost | | | | 65 + 9999 |

| Scenario | Bundle Component | Bundle 1 | Bundle 2 | Bundle 3 |
|---|---|---|---|---|
| Scenario 2 | Application Server SAN-LUN | App1, App2 Server1, Server2 SAN1, SAN2 | *App3* *Server1* *SAN1* | |

| Dependency Consideration | Dependencies Compromised | Unit Cost | Number of Instances | Itemized Cost |
|---|---|---|---|---|
| App to App (Hard) | None | 10 | 0 | 0 |
| App to App (Soft) | App2-App3 | 5 | 1 | 5 |
| App to Server | App3-Server1 | 20 | 1 | 20 |
| Server to SAN | Server1-SAN1 | 99999 | 1 | 9999 |
| Migration Event | Bundles 1-2 | Σ100, 10 | 2 | 110 |
| Total Cost | | | | 135 + 9999 |

| Scenario | Bundle Component | Bundle 1 | Bundle 2 | Bundle 3 |
|---|---|---|---|---|
| Scenario 3 | Application Server SAN-LUN | App1 Server1 SAN1 | *App2*, App3 *Server1*, Server2 *SAN1*, SAN2 | |

| Dependency Consideration | Dependencies Compromised | Unit Cost | Number of Instances | Itemized Cost |
|---|---|---|---|---|
| App to App (Hard) | App1-App2 | 10 | 1 | 10 |
| App to App (Soft) | None | 5 | 0 | 0 |
| App to Server | App3-Server1 | 20 | 1 | 20 |
| Server to SAN | Server1-SAN1 | 99999 | 1 | 9999 |
| Migration Event | Bundles 1-2 | Σ10, 100 | 2 | 110 |
| Total Cost | | | | 140 + 9999 |

| Scenario | Bundle Component | Bundle 1 | Bundle 2 | Bundle 3 |
|---|---|---|---|---|
| Scenario 4 | Application Server SAN-LUN | App1, *App3* Server1 SAN1 | *App2* Server2 SAN2 | |

| Dependency Consideration | Dependencies Compromised | Unit Cost | Number of Instances | Itemized Cost |
|---|---|---|---|---|
| App to App (Hard) | App1-App2 | 10 | 1 | 10 |
| App to App (Soft) | App2-App3 | 5 | 1 | 5 |
| App to Server | None | 20 | 0 | 0 |
| Server to SAN | None | 99999 | 0 | 0 |
| Migration Event | Bundles 1-2 | Σ100, 10 | 2 | 110 |
| Total Cost | | | | 125 |

| Scenario | Bundle Component | Bundle 1 | Bundle 2 | Bundle 3 |
|---|---|---|---|---|
| Scenario 5 | Application Server SAN-LUN | App1, App2, App3 Server1, Server2 SAN1, SAN2 | | |

| Dependency Consideration | Dependencies Compromised | Unit Cost | Number of Instances | Itemized Cost |
|---|---|---|---|---|
| App to App (Hard) | App1-App2 | 10 | 0 | 0 |
| App to App (Soft) | App2-App3 | 5 | 0 | 0 |
| App to Server | None | 20 | 0 | 0 |
| Server to SAN | None | 99999 | 0 | 0 |
| Migration Event | Bundles 1-2 | Σ1000 | 1 | 1000 |
| Total Cost | | | | 1000 |

A summary of the costs associated with the five scenarios of the present example is as follows.

| Scenario | App Combinations | Total Cost |
|---|---|---|
| Scenario1 | (App1), (App2), (App3) - 3 bundles | 65 + 9999 |
| Scenario2 | (App1, App2), (App3) - 2 bundles | 135 + 9999 |
| Scenario3 | (App1), (App2, App3) - 2 bundles | 140 + 9999 |
| Scenario4 | (App1, App3), (App2) - 2 bundles | 125 |
| Scenario5 | (App1, App2, App3) - 1 bundle | 1000 |

The optimal scenario in this example in terms of lowest cost is therefore Scenario 4. Accordingly, this scenario is used to migrate the data center.

It should be noted that the cost table may be different for a different client. Assume the above calculations were performed for a first client denoted Client 1. Another client, denoted Client 2, may have minimal or zero cost of Server-SAN dependency since that client is buying a new SAN and server and so was planning to upgrade them anyway. In that situation, on performing the re-calculations of each scenario and its corresponding cost, the least cost scenario for Client 2 would be Scenario 1. Yet another client, denoted Client 3, may not only be purchasing a new SAN and server, but may also have a very high cost of hard application to application dependency (e.g., 200 units). In that situation, on performing the re-calculations of each scenario and its corresponding cost, Scenario 2 will yield the lowest cost.

The foregoing example illustrates a simple data center migration process involving only three applications. In practice, the data center migration may involve hundreds or thousands of applications or other components, and accordingly an automated and systematic process of the type provided by present invention is particularly advantageous.

It is to be appreciated that the particular tables, dependencies, costs and other aspects of the heuristic bundle optimization process in the foregoing example are presented for purposes of illustration only, and should not be construed as limiting the scope of the invention in any way. Alternative embodiments may use a wide variety of different processes in accordance with the techniques disclosed herein.

As indicated above, the data center migration functionality can be implemented at least in part in the form of one or more software programs stored in memory and executed by a processor of a processing device such as a terminal, controller or server. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of information management systems and processing devices. The particular process steps used in the data center migration processes of the illustrative embodiments may be varied in alternative embodiments. Also, the disclosed techniques are applicable to a wide variety of different migration, transformation or other transition scenarios without regard to the particular type of IT environment. For example, the techniques are applicable to migration to or from a private or public cloud. Other transition scenarios outside of the migration context may include, for example, virtualization, tech refresh, patch installs, etc. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for use in an information management system to transition at least a portion of a data center from a first configuration to a second configuration, the method comprising the steps of:
    identifying a plurality of component bundling scenarios each specifying a separation of at least a given set of components associated with the first and second configurations into bundles for transitioning on a per-bundle basis from the first configuration to the second configuration;
    evaluating the component bundling scenarios; and
    determining an optimal one of the component bundling scenarios;
    wherein said portion of the data center is transitioned from the first configuration to the second configuration with the components being transitioned in the bundles specified by the optimal component bundling scenario; and
    wherein the identifying, evaluating and determining steps are implemented in a controller of the system, said controller comprising a processor coupled to a memory.

2. The method of claim 1 wherein the identifying step further comprises:
    identifying functional attributes of the portion of the data center to be transitioned from the first configuration to the second configuration;
    assigning weights to respective ones of the functional attributes; and
    applying a predetermined rules framework to the weighted functional attributes to identify the plurality of component bundling scenarios.

3. The method of claim 2 further comprising the step of recording the identified functional attributes in a structured normalized form in a relational database of the system.

4. The method of claim 1 wherein the controller comprises a migration controller and the transition comprises a migration of the portion of the data center from the first configuration to the second configuration.

5. The method of claim 1 wherein the set of components includes one or more applications, one or more servers, and one or more storage networks.

6. The method of claim 2 wherein the step of identifying functional attributes of the portion of the data center to be transitioned further comprises identifying dependencies among said components.

7. The method of claim 6 wherein the dependencies include at least one of application to application dependencies, application to server dependencies, and server to storage area network dependencies.

8. The method of claim 7 wherein the dependencies include application to application dependencies and the application to application dependencies include at least two different types of application to application dependencies, including a hard application to application dependency and a soft application to application dependency.

9. The method of claim 6 wherein the evaluating step includes eliminating one or more of the component bundling scenarios based at least in part on the identified dependencies.

10. The method of claim 2 wherein the step of assigning weights to respective ones of the functional attributes comprises at least one of:
    assigning ordinality weights to the respective attributes based on a relative sequence of utility; and
    assigning cardinality weights to the respective attributes based on a relative magnitude of utility.

11. A computer program product comprising a non-transitory processor-readable storage medium having encoded therein executable code of one or more software programs, wherein the one or more software programs when executed by the processor of the controller implement the steps of the method of claim 1.

12. An apparatus comprising:
a processing device having a processor coupled to a memory and configured for implementation in an information management system in which at least a portion of a data center is to be transitioned from a first configuration to a second configuration;
wherein the processing device further comprises a controller configured to:
identify a plurality of component bundling scenarios each specifying a separation of at least a given set of components associated with the first and second configurations into bundles for transitioning on a per-bundle basis from the first configuration to the second configuration;
evaluate the component bundling scenarios; and
determine an optimal one of the component bundling scenarios;
wherein said portion of the data center is transitioned from the first configuration to the second configuration with the components being transitioned in the bundles specified by the optimal component bundling scenario.

13. The apparatus of claim 12 wherein the processing device comprises at least one computer.

14. The apparatus of claim 12 wherein the controller comprises a migration controller.

15. The apparatus of claim 12 wherein the controller is implemented at least in part in software running on the processor of the processing device.

16. The apparatus of claim 12 wherein the processing device is coupled between an administrator terminal of the system and the data center.

17. An information management system comprising:
a data center; and
a controller associated with said data center, the controller being configured to facilitate transition of at least a portion of the data center from a first configuration to a second configuration;
wherein the controller comprises a non-transitory processor-readable storage medium, the controller being is operative to:
identify a plurality of component bundling scenarios each specifying a separation of at least a given set of components associated with the first and second configurations into bundles for transitioning on a per-bundle basis from the first configuration to the second configuration;
evaluate the component bundling scenarios; and
determine an optimal one of the component bundling scenarios;
wherein said portion of the data center is transitioned from the first configuration to the second configuration with the components being transitioned in the bundles specified by the optimal component bundling scenario.

18. The system of claim 17 wherein the controller is coupled between an administrator terminal of the system and the data center.

19. The system of claim 17 wherein the controller is implemented internally to the data center.

20. The system of claim 17 wherein the controller is implemented using a processing device that is separate from the data center.

* * * * *